US012679929B2

(12) United States Patent
Morishita et al.

(10) Patent No.: US 12,679,929 B2
(45) Date of Patent: Jul. 14, 2026

(54) POLYESTER RESIN

(71) Applicant: MITSUBISHI GAS CHEMICAL COMPANY, INC., Tokyo (JP)

(72) Inventors: Takami Morishita, Kanagawa (JP); Masayuki Nagai, Kanagawa (JP); Makoto Toyohara, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 495 days.

(21) Appl. No.: 18/288,072

(22) PCT Filed: Apr. 18, 2022

(86) PCT No.: PCT/JP2022/018055

§ 371 (c)(1),
(2) Date: Oct. 24, 2023

(87) PCT Pub. No.: WO2022/230710

PCT Pub. Date: Nov. 3, 2022

(65) Prior Publication Data

US 2024/0209143 A1 Jun. 27, 2024

(30) Foreign Application Priority Data

Apr. 26, 2021 (JP) ................................ 2021-074049

(51) Int. Cl.

| | |
|---|---|
| ***C08G 63/672*** | (2006.01) |
| *C08G 63/16* | (2006.01) |
| *C08L 67/02* | (2006.01) |

(52) U.S. Cl.

CPC .......... *C08G 63/672* (2013.01); *C08G 63/16* (2013.01); *C08J 2367/02* (2013.01); *C08L 67/02* (2013.01)

(58) Field of Classification Search

CPC .... C08L 67/02; C08J 2367/02; C08G 63/672; C08G 63/16

See application file for complete search history.

(56) References Cited

U.S. PATENT DOCUMENTS

| | | | | |
|---|---|---|---|---|
| 2015/0133626 | A1 | 5/2015 | Minezaki et al. | |
| 2015/0307704 | A1* | 10/2015 | Bhattacharjee | B29C 48/07 264/210.1 |
| 2017/0166694 | A1 | 6/2017 | Ochi et al. | |
| 2018/0265838 | A1 | 9/2018 | Ando et al. | |

FOREIGN PATENT DOCUMENTS

| | | | |
|---|---|---|---|
| JP | 2004-67829 | A | 3/2004 |
| JP | 2012-512936 | A | 6/2012 |
| JP | 2020-204011 | A | 12/2020 |
| JP | 2021-1310 | A | 1/2021 |
| TW | 201617403 | A | 5/2016 |
| WO | 2006/137954 | A | 12/2006 |
| WO | 2010/080117 | A1 | 7/2010 |
| WO | 2017/051913 | A1 | 3/2017 |

OTHER PUBLICATIONS

International Search Report issued Jul. 19, 2022 in International Bureau of WIPO Patent Application No. PCT/JP2022/018055 with an English translation thereof.

Written Opinion issued Jul. 19, 2022 in International Bureau of WIPO Patent Application No. PCT/JP2022/018055 with an English translation thereof.

* cited by examiner

*Primary Examiner* — Gregory Listvoyb

(74) *Attorney, Agent, or Firm* — GREENBLUM & BERNSTEIN, P.L.C.

(57) ABSTRACT

A polyester resin including dicarboxylic acid constituent units and diol constituent units, wherein the diol constituent units include a constituent unit A1 derived from a diol having a cyclic acetal skeleton and a constituent unit A2 derived from 2,2,4,4-tetramethoxy-1,3-cyclobutanediol, and wherein the dicarboxylic acid constituent units include a constituent unit B1 derived from 2,6-naphthalenedicarboxylic acid and/or dimethyl 2,6-naphthalenedicarboxylate.

4 Claims, No Drawings

POLYESTER RESIN

TECHNICAL FIELD

The present invention relates to a polyester resin.

BACKGROUND ART

An aromatic saturated polyester resin, particularly, polyethylene terephthalate (sometimes referred to as "PET" hereinafter) is a resin having a good balance among mechanical performance, solvent resistance, aroma retaining property, weathering resistance, recyclability, etc., and it has been used in a large amount mainly in applications such as bottles and films.

However, PET has high crystallizability, and when a thick molded article or sheet is tried to be produced, it suffers from the disadvantage that it is whitened due to crystallization and loses transparency. Moreover, the glass transition temperature of PET is about 80° C., so that it suffers from the disadvantage that it cannot be used in applications requiring high heat resistance, such as products used inside automobiles, packaging materials for import and export, food packaging materials to be subjected to retort treatment or microwave heating, and baby bottles and tableware to be subjected to heat sterilization.

Therefore, as a polyester resin having been improved in heat resistance while keeping high transparency, a polyester resin composed of a diol such as spiroglycol or 1,4-cyclohexanedimethanol and a dicarboxylic acid such as terephthalic acid is disclosed (refer to, for example, Patent Literature 1).

CITATION LIST

Patent Literature

Patent Literature 1

Japanese Translation of PCT International Application Publication No. 2012-512936

SUMMARY OF INVENTION

Technical Problem

However, the polyester resin described in Patent Literature 1 has a glass transition temperature of about 128° C. though it is colorless and transparent, and therefore, from the viewpoint of heat resistance, there is room for further improvement.

The present invention has been made in the light of the above problem, and it is an object of the present invention to provide a polyester resin excellent in transparency and heat resistance.

Solution to Problem

The present inventors have earnestly studied to solve the above problem. As a result, they have found that by using prescribed diol constituent units and dicarboxylic acid constituent units, the above problem can be solved, and they have achieved the present invention.

That is to say, the present invention is as follows.

[1]

A polyester resin comprising:

dicarboxylic acid constituent units and diol constituent units, wherein the diol constituent units comprise a constituent unit A1 derived from a diol having a cyclic acetal skeleton, and a constituent unit A2 derived from 2,2,4,4-tetramethoxy-1,3-cyclobutanediol, and wherein the dicarboxylic acid constituent units comprise a constituent unit B1 derived from 2,6-naphthalenedicarboxylic acid and/or dimethyl 2,6-naphthalenedicarboxylate.

[2]

The polyester resin according to [1], wherein the diol constituent units further comprise a constituent unit A3 derived from ethylene glycol.

[3]

The polyester resin according to [1] or [2], wherein the diol having a cyclic acetal skeleton comprises at least one selected from the group consisting of compounds represented by the following formula (1) and formula (2):

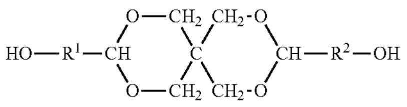

(1)

wherein $R^1$ and $R^2$ each independently represent a divalent aliphatic group having 1 to 10 carbon atoms, a divalent alicyclic group having 3 to 10 carbon atoms, or a divalent aromatic group having 6 to 10 carbon atoms,

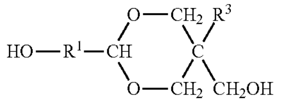

(2)

wherein $R^1$ represents a divalent aliphatic group having 1 to 10 carbon atoms, a divalent alicyclic group having 3 to 10 carbon atoms, or a divalent aromatic group having 6 to 10 carbon atoms, and $R^3$ represents a monovalent aliphatic group having 1 to 10 carbon atoms, a monovalent alicyclic group having 3 to 10 carbon atoms, or a monovalent aromatic group having 6 to 10 carbon atoms.

[4]

The polyester resin according to any one of [1] to [3], wherein the diol having a cyclic acetal skeleton comprises 3,9-bis(1,1-dimethyl-2-hydroxyethyl)-2,4,8,10-tetraoxaspiro[5.5]undecane.

Advantageous Effect of Invention

According to the present invention, a polyester resin excellent in transparency and heat resistance can be provided.

DESCRIPTION OF EMBODIMENT

Hereinafter, an embodiment of the present invention (referred to as a "present embodiment" hereinafter) will be described in detail, but the present invention is not limited to this, and various modifications can be made without departing from the scope of the present invention.

1. Polyester Resin

The polyester resin of the present embodiment comprises dicarboxylic acid constituent units and diol constituent units, and the diol constituent units comprise a constituent unit A1 derived from a diol having a cyclic acetal skeleton and a constituent unit A2 derived from 2,2,4,4-tetramethoxy-1,3-cyclobutanediol, and the dicarboxylic acid constituent units comprise a constituent unit B1 derived from 2,6-naphthalenedicarboxylic acid and/or dimethyl 2,6-naphthalenedicarboxylate.

In the polyester resin of the present embodiment, by using the constituent unit A2 derived from 2,2,4,4-tetramethoxy-1,3-cyclobutanediol in addition to the constituent unit A1 derived from a diol having a cyclic acetal skeleton, as above, the glass transition temperature further increases, and the polyester resin can exhibit high heat resistance.

In the polyester resin of the present embodiment, by using the constituent unit A1 derived from a diol having a cyclic acetal skeleton and the constituent unit A2 derived from 2,2,4,4-tetramethoxy-1,3-cyclobutanediol, the crystallizability decreases, and the polyester resin can exhibit high transparency. Hereinafter, the constituent units will be described in detail.

1. 1. Diol Constituent Unit

The diol constituent units include a constituent unit A1 derived from a diol having a cyclic acetal skeleton and a constituent unit A2 derived from 2,2,4,4-tetramethoxy-1,3-cyclobutanediol, and may include a constituent unit A3 derived from ethylene glycol and a constituent unit A4 derived from other diols, as needed.

1. 1. 1. Constituent Unit A1

The constituent unit A1 is a constituent unit derived from a diol having a cyclic acetal skeleton. The diol having a cyclic acetal skeleton is not particularly limited, but it is, for example, at least one selected from the group consisting of compounds represented by the following formula (1) and formula (2). By using such a diol, the crystallizability is more decreased, and the heat resistance tends to be more improved.

(1)

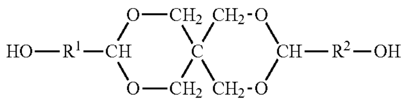

wherein $R^1$ and $R^2$ each independently represent a divalent aliphatic group having 1 to 10 carbon atoms, a divalent alicyclic group having 3 to 10 carbon atoms, or a divalent aromatic group having 6 to 10 carbon atoms, (2)

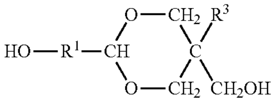

wherein $R^1$ represents a divalent aliphatic group having 1 to 10 carbon atoms, a divalent alicyclic group having 3 to 10 carbon atoms, or a divalent aromatic group having 6 to 10 carbon atoms, and $R^3$ represents a monovalent aliphatic group having 1 to 10 carbon atoms, a monovalent alicyclic group having 3 to 10 carbon atoms, or a monovalent aromatic group having 6 to 10 carbon atoms.

Examples of the divalent aliphatic groups having 1 to 10 carbon atoms represented by $R^1$ and $R^2$ include, but not limited to, straight-chain aliphatic groups, such as a methylene group, an ethylene group, a propylene group, a butylene group, a pentylene group, and a hexylene group; and divalent branched aliphatic groups, such as an isopropylene group, an isobutylene group, a tertiary butylene group, a neopentylene group, and a 2-hexylene group.

Examples of the divalent alicyclic groups having 3 to 10 carbon atoms represented by $R^1$ and $R^2$ include, but not limited to, a cyclopropylene group, a cyclobutylene group, a cyclopentylene group, a cyclohexylene group, and a cyclooctylene group.

Examples of the divalent aromatic groups having 6 to 10 carbon atoms represented by $R^1$ and $R^2$ include, but not limited to, a phenylene group and a naphthylene group.

Examples of the monovalent aliphatic groups having 1 to 10 carbon atoms represented by $R^3$ include, but not limited to, straight-chain aliphatic groups, such as a methyl group, an ethyl group, a propyl group, a butyl group, a pentyl group, and a hexyl group; and monovalent branched aliphatic groups, such as an isopropyl group, an isobutyl group, a tertiary butyl group, a neopentyl group, and a 2-hexyl group.

Examples of the monovalent alicyclic groups having 3 to 10 carbon atoms represented by $R^3$ include, but not limited to, a cyclopropyl group, a cyclobutyl group, a cyclopentyl group, a cyclohexyl group, and a cyclooctyl group.

Examples of the monovalent aromatic groups having 6 to 10 carbon atoms represented by $R^3$ include, but not limited to, a phenyl group and a naphthyl group.

Examples of the compounds represented by the formula (1) or the formula (2) include, but not limited to, 3,9-bis(1,1-dimethyl-2-hydroxyethyl)-2,4,8,10-tetraoxaspiro[5.5]undecane (also referred to as "spiroglycol" hereinafter) and 5-methylol-5-ethyl-2-(1,1-dimethyl-2-hydroxyethyl)-1,3-dioxane (also referred to as "dioxane glycol" hereinafter). Among these, spiroglycol is more preferable. Because the constituent unit A1 derived from such a diol having a cyclic acetal skeleton is included, the crystallizability is more decreased, and the heat resistance tends to be more improved. The diols having a cyclic acetal skeleton may be used alone, or may be used in combination of two or more.

The content of the constituent unit A1 is preferably 1 to 60 mol %, more preferably 3 to 45 mol %, and still more preferably 5 to 30 mol %, based on the total amount of the diol constituent units. Because the content of the constituent unit A1 is in the above range, the crystallizability is more decreased, and the heat resistance tends to be more improved.

1. 1. 2. Constituent Unit A2

The constituent unit A2 is a constituent unit derived from 2,2,4,4-tetramethoxy-1,3-cyclobutanediol. Because the constituent unit A2 is included, the crystallizability is more decreased, and the heat resistance is more improved.

The content of the constituent unit A2 is preferably 3 to 55 mol %, more preferably 5 to 45 mol %, and still more preferably 10 to 35 mol %, based on the total amount of the diol constituent units. Because the content of the constituent unit A2 is in the above range, the crystallizability is more decreased, and the heat resistance tends to be more improved.

1. 1. 3. Constituent Unit A3

The constituent unit A3 is a constituent unit derived from ethylene glycol. Because the constituent unit A3 is included, condensation polymerization is easily promoted in the synthesis of the resin, and the production efficiency can be enhanced.

The content of the constituent unit A3 is preferably 1 to 25 mol %, more preferably 3 to 20 mol %, and still more preferably 5 to 15 mol %, based on the total amount of the diol constituent units. Because the content of the constituent unit A3 is in the above range, the production efficiency and the heat resistance tend to be more improved.

1. 1. 4. Constituent Unit A4

The constituent unit A4 is a constituent unit derived from other diols. Examples of the other diols include, but not limited to, aliphatic diols, such as trimethylene glycol, 1,4-butanediol, 1,5-pentanediol, 1,6-hexanediol, diethylene glycol, propylene glycol, and neopentyl glycol; polyether diols, such as polyethylene glycol, polypropylene glycol, and polybutylene glycol; alicyclic diols, such as 1,3-cyclohexanedimethanol, 1,4-cyclohexanedimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, and pentacyclododecane dimethanol; bisphenols, such as 4,4'-(1-methylethylidene)bisphenol, methylenebisphenol, 4,4'-cyclohexylidene bisphenol, and 4,4'-sulfonylbisphenol; alkylene oxide adducts of the above bisphenols; aromatic dihydroxy compounds, such as hydroquinone, resorcinol, 4,4'-dihydroxybiphenyl, 4,4'-dihydroxydiphenyl ether, and 4,4'-dihydroxydiphenyl benzophenone; and alkylene oxide adducts of the above aromatic dihydroxy compounds. The other diols may be used alone, or may be used in combination of two or more.

Among these, the alicyclic diols are preferable, and 1,4-cyclohexanedimethanol is more preferable. Because such a constituent unit A4 is included, the crystallizability is more decreased, and the heat resistance tends to be more improved.

When the constituent unit A4 is included, the content thereof is preferably 25 to 75 mol %, more preferably 35 to 65 mol %, and still more preferably 45 to 55 mol %, based on the total amount of the diol constituent units. Because the content of the constituent unit A4 is in the above range, the crystallizability is more decreased, and the heat resistance tends to be more improved.

1. 2. Dicarboxylic Acid Constituent Unit

The dicarboxylic acid constituent units include a constituent unit B1 derived from 2,6-naphthalenedicarboxylic acid and/or dimethyl 2,6-naphthalenedicarboxylate, and may include a constituent unit B2 derived from other dicarboxylic acids, as needed.

1. 2. 1. Constituent Unit B1

The constituent unit B1 is a constituent unit derived from 2,6-naphthalenedicarboxylic acid and/or dimethyl 2,6-naphthalenedicarboxylate. Because the constituent unit B1 is included, the crystallizability is more decreased, and the heat resistance is more improved. The dimethyl 2,6-naphthalenedicarboxylate is contained in the polyester resin as a dicarboxylic acid constituent unit that is substantially the same as the 2,6-naphthalenedicarboxylic acid due to the transesterification reaction.

The content of the constituent unit B1 is preferably 10 to 100 mol %, more preferably 50 to 100 mol %, and still more preferably 80 to 100 mol %, based on the total amount of the dicarboxylic acid constituent units. Because the content of the constituent unit B1 is in the above range, the crystallizability is more decreased, and the heat resistance tends to be more improved.

1. 2. 2. Constituent Unit B2

The constituent unit B2 is a constituent unit derived from other dicarboxylic acids. Examples of the other dicarboxylic acids include, but not limited to, aliphatic dicarboxylic acids, such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid, and pentacyclododecanedicarboxylic acid; and dicarboxylic acid units derived from aromatic dicarboxylic acids, such as terephthalic acid, isophthalic acid, phthalic acid, 2-methylterephthalic acid, biphenyldicarboxylic acid, and tetralindicarboxylic acid. The other dicarboxylic acids may be used alone, or may be used in combination of two or more.

The content of the constituent unit B2 is preferably 0 to 90 mol %, more preferably 0 to 50 mol %, and still more preferably 0 to 20 mol %, based on the total amount of the dicarboxylic acid constituent units. Because the content of the constituent unit B2 is in the above range, the mechanical properties tend to be more improved.

2. Method for Producing Polyester Resin

The method for producing the polyester resin of the present embodiment is not particularly limited, and conventionally well-known methods can be applied. Examples of the methods include a transesterification method and a direct polymerization method.

As the transesterification method, a method having a transesterification step of heating a raw material diol that becomes a diol constituent unit, a dicarboxylic acid ester that becomes a dicarboxylic acid constituent unit, and a catalyst to a prescribed temperature to promote the transesterification reaction, and a polycondensation step of adding a catalyst and a heat stabilizer to the resulting solution and further performing heating and reduction of pressure to promote the polycondensation reaction can be mentioned.

As the direct polymerization method, a method having an esterification reaction step of heating a raw material diol that becomes a diol constituent unit, a dicarboxylic acid that becomes a dicarboxylic acid constituent unit, and a catalyst to a prescribed temperature to promote the esterification reaction, and a polycondensation step of adding a catalyst and a heat stabilizer to the resulting solution and further performing heating and reduction of pressure to promote the polycondensation reaction can be mentioned.

In the above methods, the raw material diol and the raw material dicarboxylic acid may be fed all together before starting of the reaction, or may be partially fed in the middle of the reaction.

In the above methods, a well-known catalyst can be used. Examples of the well-known catalysts include, but not limited to, metallic magnesium, sodium, an alkoxide of magnesium; and fatty acid salts, carbonates, hydroxides, chlorides, and oxides of zinc, lead, cerium, cadmium, manganese, lithium, sodium, potassium, calcium, nickel, magnesium, vanadium, aluminum, tin, germanium, antimony, and titanium. Among these, compounds of manganese, titanium, antimony, and germanium are preferable, and manganese acetate, titanium tetrabutoxide, antimony trioxide, and germanium dioxide are particularly preferable. These catalysts may be used alone, or may be used in combination of two or more.

In addition, well-known additives may be used in the above methods, as needed. Examples of the well-known additives include, but not limited to, an etherification inhibitor, various stabilizers such as a heat stabilizer and a light stabilizer, a polymerization modifier, an antistatic agent, a lubricant, an antioxidant, a mold release agent, and a basic compound.

Examples of the etherification inhibitors include, but not limited to, amine compounds.

Examples of the heat stabilizers include, but not limited to, phosphorus compounds. Among these, phosphoric acid esters are preferable, and triethyl phosphate is more preferable.

Examples of the basic compounds include, but not limited to, carbonates, hydroxides, carboxylates, oxides, chlorides, and alkoxides of alkali metals, such as lithium, sodium, and potassium. Among these, potassium acetate, sodium acetate, and lithium acetate are particularly preferable.

3. Resin Composition

The resin composition of the present embodiment contains the above polyester resin, and in addition, it may contain other additives as needed.

The resin composition of the present embodiment is excellent in heat resistance and transparency, and can be preferably used for food packaging materials to be subjected to retort treatment or microwave heating, for containers to be subjected to heat sterilization, such as baby bottles and tableware, and in other applications requiring high heat resistance.

EXAMPLES

Hereinafter, the present invention will be specifically described using examples and comparative examples. The present invention is in no way limited by the following examples.

[Glass Transition Temperature]

The glass transition temperature (Tg) of the polyester resin was determined by introducing about 10 mg of a sample in an aluminum unsealed container, measuring a temperature using a differential scanning calorimeter (model: DSC/TA-50WS) manufactured by Shimadzu Corporation at a heating rate of 20° C./min in a stream of nitrogen gas (50 ml/min), and taking a temperature that had changed by ½ of a difference of the baseline between before and after transition of the DSC curve, as a glass transition temperature.

[Crystallizability]

The low crystallizability was evaluated by enthalpy of the crystallization peak during cooling. The enthalpy of the crystallization exothermic peak during cooling was determined by measuring the area of an exothermic peak, which has appeared by measuring the aforementioned glass transition temperature, followed by keeping the sample at 280° C. for 1 minute, and followed by cooling the sample at a cooling rate of 10° C./min.

(Evaluation Criteria)

○: The enthalpy of the crystallization peak during cooling is 5 J/g or less.

X: The enthalpy of the crystallization peak during cooling is more than 5 J/g.

Example 1

A 30 L polyester resin production apparatus equipped with a partial condenser, a total condenser, a cold trap, a stirrer with a torque detector, a heating device, and a nitrogen feed pipe was charged with 7759 g of dimethyl 2,6-naphthalenedicarboxylate, 2753 g of ethylene glycol, 2465 g of spiroglycol, 1152 g of 2,2,4,4-tetramethoxy-1,3-cyclobutanediol, 3265 g of 1,4-cyclohexanedimethanol, 3.400 g of titanium tetrabutoxide, and 0.784 g of potassium acetate, and transesterification reaction was carried out by a conventional method while heating the components up to 225° C.

After the distillation volume of methanol produced by the transesterification reaction became 90% of the theoretical amount, 1.045 g of germanium dioxide and 3.639 g of triethyl phosphate were added to the reaction liquid. Thereafter, the pressure was reduced to 13.3 kPa over a period of 1 hour while maintaining the reaction liquid at 225° C., and then, heating up to 270° C. and reduction of pressure to 130 Pa were carried out over a period of 1 hour to perform polycondensation reaction. Then, the stirring rate was slowly decreased from 100 rpm, and when the stirring rate became 10 rpm and the torque of the stirrer became 100 N-m, the reaction was finished, and about 8 kg of a polyester resin was obtained as pellets.

Example 2, Comparative Examples 1 to 5

Polyester resins were prepared in the same manner as in Example 1, except that monomer compositions described in Table 1 were used.

TABLE 1

| | | | Example | | Comparative Example | | | | |
|---|---|---|---|---|---|---|---|---|---|
| | | | 1 | 2 | 1 | 2 | 3 | 4 | 5 |
| Constituent unit A1 | Spiroglycol | mol % | 20 | 10 | 38 | 45 | 37 | 0 | 0 |
| Constituent unit A2 | 2,2,4,4-Tetramethoxy-1,3-cyclobutanediol | mol % | 18 | 28 | 0 | 0 | 0 | 33 | 0 |
| Constituent unit A3 | Ethylene glycol | mol % | 11 | 11 | 11 | 5 | 63 | 0 | 100 |
| Constituent unit A4 | 1,4-Cyclohexanedimethanol | mol % | 51 | 51 | 51 | 50 | 0 | 67 | 0 |
| Constituent unit B1 | Dimethyl 2,6-naphthalenedicarboxylate | mol % | 100 | 100 | 100 | 0 | 100 | 0 | 100 |
| Constituent unit B2 | Dimethyl terephthalate | mol % | 0 | 0 | 0 | 100 | 0 | 100 | 0 |
| Evaluation | Glass transition temperature | ° C. | 143 | 151 | 135 | 114 | 134 | 122 | 118 |
| | Low crystallizability | | ○ | ○ | ○ | ○ | ○ | ○ | x |

In Table 1, the amounts (mol %) of the constituent units A1 to A4 used, based on 100 mol % of the diol constituent units, and the amounts (mol %) of the constituent units B1 and B2 used, based on 100 mol % of the dicarboxylic acid constituent units are shown.

INDUSTRIAL APPLICABILITY

The polyester resin of the present invention has industrial applicability as a food contact material or the like having high transparency and heat resistance.

The invention claimed is:

1. A polyester resin comprising:

dicarboxylic acid constituent units and diol constituent units, wherein the diol constituent units comprise a constituent unit A1 derived from a diol having a cyclic acetal skeleton, and a constituent unit A2 derived from 2,2,4,4-tetramethoxy-1,3-cyclobutanediol, and wherein the dicarboxylic acid constituent units comprise a constituent unit B1 derived from 2,6-naphthalenedicarboxylic acid and/or dimethyl 2,6-naphthalenedicarboxylate.

2. The polyester resin according to claim 1, wherein the diol constituent units further comprise a constituent unit A3 derived from ethylene glycol.

3. The polyester resin according to claim 1, wherein the diol having a cyclic acetal skeleton comprises at least one selected from the group consisting of compounds represented by the following formula (1) and formula (2):

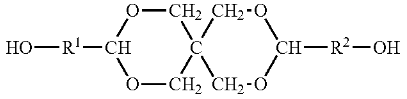

(1)

wherein $R^1$ and $R^2$ each independently represent a divalent aliphatic group having 1 to 10 carbon atoms, a divalent alicyclic group having 3 to 10 carbon atoms, or a divalent aromatic group having 6 to 10 carbon atoms,

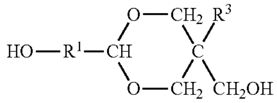

(2)

wherein $R^1$ represents a divalent aliphatic group having 1 to 10 carbon atoms, a divalent alicyclic group having 3 to 10 carbon atoms, or a divalent aromatic group having 6 to 10 carbon atoms, and $R^3$ represents a monovalent aliphatic group having 1 to 10 carbon atoms, a monovalent alicyclic group having 3 to 10 carbon atoms, or a monovalent aromatic group having 6 to 10 carbon atoms.

4. The polyester resin according to claim 1, wherein the diol having a cyclic acetal skeleton comprises 3,9-bis(1,1-dimethyl-2-hydroxyethyl)-2,4,8,10-tetraoxaspiro[5.5]undecane.

* * * * *